UNITED STATES PATENT OFFICE.

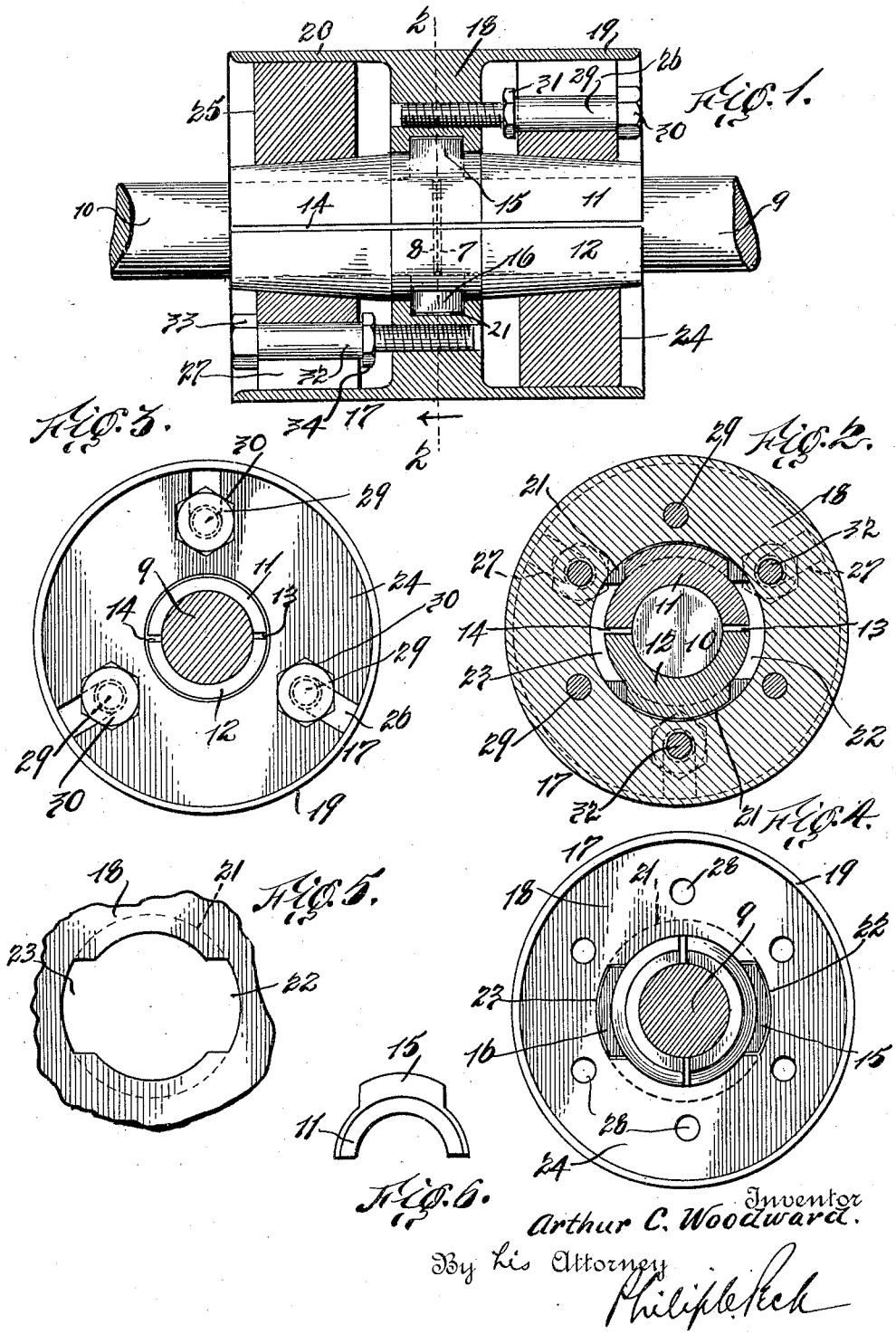

ARTHUR C. WOODWARD, OF CRANFORD, NEW JERSEY, ASSIGNOR TO THE A. & F. BROWN COMPANY, OF ELIZABETHPORT, NEW JERSEY, A CORPORATION OF NEW JERSEY.

SHAFT-COUPLING.

1,393,064.    Specification of Letters Patent.    Patented Oct. 11, 1921.

Application filed May 5, 1920. Serial No. 379,010.

*To all whom it may concern:*

Be it known that I, ARTHUR C. WOODWARD, a citizen of the United States, and a resident of Cranford, in the county of Union and State of New Jersey, have invented certain new and useful Improvements in Shaft-Couplings, of which the following is a specification, reference being made to the accompanying drawings, forming a part thereof.

My invention relates particularly to that type of shaft-couplings which act through compression to tightly hold the abutting ends of the shafting together in operative position. The objects of my invention are, among other things, to provide a simplified and economical shaft-coupling in which the members coact with increased efficiency in gripping and holding the ends of the shafting, and to further provide in such coupling means by which such members can be readily secured and fastened together to bind the shaft ends, and the same means may be actuated to positively release such members from each other to loosen the shafts in a simple and effective manner at will. A preferred embodiment of my improved shaft-coupling is shown in the accompanying drawings in which—

Figure 1 is a vertical elevation, partly in section, showing my improved coupling fastened together to securely hold the ends of the shafting;

Fig. 2 is a cross-sectional view taken on the line 2—2 of Fig. 1 looking in the direction of the arrow;

Fig. 3 is an end view of the coupling looking toward the left in Fig. 1;

Fig. 4 is an end view of the coupling with the inner shaft-binding parts shifted to a different position from that shown in Fig. 1;

Fig. 5 is a detail view of the sleeve-holding recess formed in the outer shell further illustrated in Fig. 4; and Fig. 6 is a detail of the central portion of one of the semi-cylindrical sleeves surrounding the ends of the shafting.

Similar numerals refer to similar parts throughout the several figures.

Referring to the drawings, the ends 7 and 8 of the two shafts 9 and 10 respectively which are to be coupled together by my coupling, are preferably squared so as to abut against each other as shown in Fig. 1. Surrounding the shaft ends 7 and 8 extending along the surface of the shafts 9 and 10 are two similarly shaped semi-cylindrical sleeves 11 and 12, the central portions of which preferably surround the juncture of the shaft ends 7 and 8; the two longitudinal edges of the sleeves 11 and 12 are slightly cut away to form the longitudinal slots 13 and 14 to allow for the compression of the sleeves 11 and 12 about the shaft ends 7 and 8 when the shaft coupling as a whole is compressed in operative locked position to hold securely together the two shafts 9 and 10. Extending outwardly from the upper portion of the cylindrical part of the sleeves 11 and 12 are projecting lugs 15 and 16 respectively which are preferably integral with the sleeves. The outer shell 17 of my coupling is also integral and comprises the body portion 18 annular in formation and centrally disposed within the shell with the circular depending flanges 19 and 20 extending in opposite directions from the body 18. Within the inner circular surface of the body 18 is formed a transverse annular recess 21 of slightly greater width than that of the projecting lugs 15 and 16 as shown in Fig. 1. As shown particularly in Figs. 2 and 5, the recess 21 is broken away on the side of the body 18 to form two similar, oppositely-disposed openings 22 and 23. The outer surface of the sleeves 11 and 12 is tapered toward the ends in opposite directions from the central portions as shown in Fig. 1; two collars 24 and 25 are provided having their central openings beveled as shown to fit over and coact with the tapered surface of sleeves 11 and 12 when such collars 24 and 25 have been pushed inwardly toward the body 18 within the flanges 19 and 20 respectively as shown in Fig. 1.

These collars 24 and 25 are forced inwardly and are tightly held in position within the outer shell 17 by having radial slots 26 and 27 respectively cut therein, extending toward the periphery as shown in Fig. 3, each set of such slots preferably being three in number and arranged equidistantly from each other as shown in this figure. Within the body 18 are drilled six equally spaced apart screw threaded holes 28, to be engaged by two sets of screw-bolts hereafter to be described, the threads of one set of holes 28 on one side of the body 18 being inclined in one direction while the other set on the opposite side of the body 18 are cut in the opposite direction to coact with such screw-bolts. Within the slots 26, I have arranged one set of bolts comprising three double headed screw bolts 29, the outer hexagonal head 30 being on the outer end of the bolt to press against the collar 24 while an inner head 31 is formed in the bolt so as to provide a loose fit in the slot 26 between the head 30 and the head 31 due to the distance being slightly in excess of the thickness of the collar 24. In similar fashion on the collar 25 I have provided a second set of three bolts 32 having the outer hexagonal head 33 and inner head 34 so disposed as to provide a similar slightly greater space between the head 33 and collar 34 than is the length of the slot 27. In Fig. 1 this excess space is indicated on the inner sides of the two collars 24 and 25 respectively.

The preferred method of using my shaft coupling is substantially as follows: The two sleeves 11 and 12 are placed about the shaft ends 7 and 8 after the outer shell 17 has been slipped over the shafts 9 and 10 while the collars 24 and 25 loosely surround the sleeves 11 and 12 respectively; then the projecting lugs 15 and 16 are inserted through the openings 22 and 23 to be contained in the recess 21 as shown in Fig. 4. After which the shafts 9 and 10, together with the sleeves 11 and 12 and collars 24 and 25, are given a quarter turn which brings the parts into the position shown in Fig. 2. The two sets of bolts 29 and 32 loosely held within the slots 26 and 27 in the collars 24 and 25 are screwed into the holes 28 as shown in Fig. 1 by means of the heads 30 and 33, the bolts being screwed into the body 18 in opposite directions, thereby drawing the collars 24 and 25 inwardly within the cylindrical flanges 19 and 20 so as to force such collars in close operative position through the engagement of their beveled openings with the tapered ends of the cylindrical sleeves 11 and 12, all as shown in Fig. 1. By this means a firm and secure hold on the shaft-ends 7 and 8 is attained through the compression of the outer portions of the sleeves 11 and 12 by the inward movement toward each other of the collars 24 and 25 between the sleeves and flanges of the outer shell 17. To release my shaft coupling all that is required is the unscrewing of heads 30 and 33 which brings the inner heads 31 and 34 against the inner surface of the collars 24 and 25 to force same positively outwardly from their wedged position between the sleeves 11 and 12 and their coacting flanges 19 and 20.

It will be observed that my improved shaft-coupling embodies the same positive means to detach or release the coacting collars and sleeves theretofore held when screwed home under compression about the shaft ends, such means readily forcing the collars 24 and 25 outwardly by the unscrewing of the bolts 29 and 32, the loose fit in the slots 26 and 27, avoiding any binding between the bolts and the collars when it is desired to detach the coupling from the shafts.

While the construction shown and described embodies the invention in its preferred form, it will be understood that changes and variations may be made therein without departing from the invention.

I claim as my invention:

1. A shaft-coupling comprising two shaft-engaging sleeves having their exterior surfaces tapered toward their ends, an outer shell surrounding the sleeves, two sleeve-engaging collars interposed between the sleeve and outer shell, and means bearing on the outer faces of said collars to inwardly wedge each collar separately between the sleeves and outer shell.

2. A shaft-coupling comprising two semi-cylindrical, shaft-engaging sleeves having their exterior surfaces tapered toward their ends, an outer shell surrounding the sleeves, two sleeve-engaging collars interposed between the sleeves and outer shell, and means engaging the outer faces of said collars to force inwardly and wedge same between the sleeves and the outer shell, said means also being operable to force said collars outwardly to release said sleeves from the shafts.

3. A shaft-coupling comprising two shaft-engaging sleeves having their exterior surfaces tapered toward their ends, an outer shell surrounding the sleeves, two sleeve-engaging collars having beveled openings coacting with the tapered surfaces of the sleeves interposed between the sleeves and outer shell, and means bearing on the outer faces of said collars to inwardly wedge each collar separately between the sleeves and outer shell.

4. A shaft-coupling comprising two shaft-engaging sleeves, an outer shell surrounding the sleeves, binding collars interposed between the sleeves and outer shell, and means for separately wedging each collar without rotation between said sleeves and outer shell.

5. A shaft-coupling comprising two semi-cylindrical, shaft-engaging sleeves having their exterior surfaces tapered toward their ends, a separable outer shell surrounding the sleeves, two sleeve-engaging collars having beveled openings coacting with the tapered surfaces of the sleeves interposed between the sleeves and outer shell, and means engaging the outer faces of said collars to force inwardly and wedge same between the sleeves and the outer shell, said means also being operable to force said collars outwardly to release said sleeve from the shafts.

6. A shaft-coupling comprising two semi-cylindrical, shaft-engaging sleeves having their exterior surfaces tapered toward their ends, a separable outer shell surrounding the sleeves, two sleeve-engaging collars having beveled openings coacting with the tapered surfaces of the sleeves transversely interposed between the sleeves and outer shell, and means engaging the outer faces of said collars to force inwardly and wedge same between the sleeves and the outer shell, said means also being operable to force said collars outwardly to release said sleeve from the shafts.

7. A shaft-coupling comprising two semi-cylindrical, shaft-engaging sleeves having their exterior surfaces tapered toward their ends, an outer shell surrounding the sleeves, two sleeve-engaging collars interposed between the sleeves and outer shell, and means engaging with said collars and said shell engaging the outer faces of said collars to force inwardly and wedge same between the sleeves and the outer shell.

8. A shaft-coupling comprising two semi-cylindrical, shaft-engaging sleeves having their exterior surfaces tapered toward their ends, a separable outer shell surrounding the sleeves, two sleeve-engaging collars interposed between the sleeves and outer shell, and means engaging with said collars and said shell engaging the outer faces of said collars to force inwardly and wedge same between the sleeves and the outer shell, said means also being operable to force said collars outwardly to release said sleeves from the shafts.

9. A shaft-coupling comprising two semi-cylindrical, shaft-engaging sleeves having their exterior surfaces tapered toward their ends, an outer shell surrounding said sleeves having a body portion with an annular recess holding said sleeves in longitudinal alinement, two sleeve-engaging collars having beveled openings transversely interposed between the sleeves and outer shell, and means pressing on the outer faces of said collars and engaging with the body portion to force said collars inwardly to bind said sleeves to the shafts and also to force same outwardly to release said shafts.

10. A shaft-coupling comprising two semi-cylindrical, shaft-engaging sleeves having their exterior surfaces tapered toward their ends, an outer shell surrounding said sleeves having a body portion, with an annular recess holding said sleeves in longitudinal alinement, two sleeve-engaging collars having beveled openings transversely interposed between the sleeves and outer shell, and two sets of screw bolts pressing on the outer faces of said collars and engaging with the body portion to force said collars inwardly to bind said sleeves to the shafts and also to force same outwardly to release said shafts.

11. In a shaft-coupling comprising shaft-engaging sleeves, an outer shell surrounding the sleeves and binding collars interposed between the sleeves and outer shell, screw-bolts having spaced-apart heads engaging either side of said collars to force said collars inwardly to bind the sleeves to the shafts when rotated in one direction and to force said collars outwardly when oppositely rotated, said bolt heads bearing on the outer and inner faces of said collars respectively.

12. In a shaft-coupling comprising shaft-engaging sleeves, an outer shell surrounding the sleeves and binding collars interposed between the sleeves and outer shell, screw-bolts having heads spaced apart a greater distance from each other than the thickness of said collars and engaging either side of said collars to force said collars inwardly to bind the sleeves to the shafts when rotated in one direction and to force said collars outwardly when oppositely rotated, said bolt heads bearing on the outer and inner face of said collars respectively.

13. A shaft-coupling comprising two shaft-engaging sleeves, an outer shell having an annular body portion to hold the sleeves in alinement, binding collars interposed between the sleeves and outer shell, and means coacting with either face of the collars and with said body portion to force inwardly or outwardly either of said collars independently of the other.

14. A shaft-coupling comprising two shaft-engaging sleeves, an independent outer shell having an annular body portion to hold the sleeves in alinement, binding collars interposed wedgeably between the sleeves and outer shell, and means coacting with either face of the collars and with said body portion to force inwardly or outwardly either of said collars independently of the other.

ARTHUR C. WOODWARD.

Witness:
JOHN J. FRANK.